(12) United States Patent
Chun et al.

(10) Patent No.: US 11,776,750 B2
(45) Date of Patent: Oct. 3, 2023

(54) CERAMIC ELECTRONIC COMPONENT (71) Applicant: SAMSUNG ELECTRO-MECHANICS CO., LTD., Suwon-si (KR)

(72) Inventors: Hee Sun Chun, Suwon-si (KR); Hui Sun Park, Suwon-si (KR); Tae Hyung Kim, Suwon-si (KR); Jeong Wook Seo, Suwon-si (KR); Hyo Ju Lee, Suwon-si (KR); Hyeg Soon An, Suwon-si (KR); Jin Woo Kim, Suwon-si (KR); Seok Hyun Yoon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 10 days.

(21) Appl. No.: 17/571,753

(22) Filed: Jan. 10, 2022

(65) Prior Publication Data

US 2023/0129325 A1    Apr. 27, 2023

(30) Foreign Application Priority Data

Oct. 21, 2021  (KR) .......................... 10-2021-0141261

(51) Int. Cl.
  *H01G 4/12* (2006.01)
  *H01G 4/008* (2006.01)
  *H01G 4/012* (2006.01)
  *H01G 4/30* (2006.01)

(52) U.S. Cl.
  CPC ........... *H01G 4/1227* (2013.01); *H01G 4/008* (2013.01); *H01G 4/012* (2013.01); *H01G 4/30* (2013.01)

(58) Field of Classification Search
  CPC ...... H01G 4/008; H01G 4/012; H01G 4/1227; H01G 4/30
  See application file for complete search history.

(56) References Cited

U.S. PATENT DOCUMENTS

| 6,917,513 | B1 | 7/2005 | Kim et al. | |
|---|---|---|---|---|
| 2011/0205687 | A1* | 8/2011 | Inoue | H01G 4/1227 361/321.4 |
| 2015/0287535 | A1* | 10/2015 | Nakanishi | H01G 4/1227 361/301.4 |
| 2019/0115153 | A1* | 4/2019 | Park | H01G 4/1227 |
| 2020/0251242 | A1* | 8/2020 | Kwon | C04B 35/4682 |
| 2020/0258685 | A1* | 8/2020 | Ham | C04B 35/4682 |
| 2022/0102076 | A1* | 3/2022 | Isota | H01G 4/012 |
| 2022/0181080 | A1* | 6/2022 | Chun | H01G 4/012 |
| 2022/0189694 | A1* | 6/2022 | Kim | H01G 4/232 |
| 2022/0204407 | A1* | 6/2022 | Park | H01F 27/2804 |

(Continued)

FOREIGN PATENT DOCUMENTS

KR    10-2005-0100427 A    10/2005

*Primary Examiner* — Nathan Milakovich
(74) *Attorney, Agent, or Firm* — MORGAN, LEWIS & BOCKIUS LLP (57) ABSTRACT

A ceramic electronic component includes a body, including a dielectric layer and an internal electrode, and an external electrode disposed on the body and connected to the internal electrode. At least a region of the dielectric layer includes tin (Sn) and a lanthanide rare earth element (RE) including dysprosium (Dy). In the at least a region of the dielectric layer, a molar ratio of tin (Sn) to dysprosium (Dy) is from 0.15 to 0.30.

14 Claims, 3 Drawing Sheets

(56) References Cited

U.S. PATENT DOCUMENTS

2022/0301773 A1\* 9/2022 Hamada ................ H01G 4/008
2023/0126670 A1\* 4/2023 Kim ........................ H01G 4/30
361/301.4

\* cited by examiner

CERAMIC ELECTRONIC COMPONENT

CROSS-REFERENCE TO RELATED APPLICATION

The present application claims the benefit of priority to Korean Patent Application No. 10-2021-0141261, filed on Oct. 21, 2021 in the Korean Intellectual Property Office, the entire disclosure of which is incorporated herein by reference.

TECHNICAL FIELD

The present disclosure relates to a ceramic electronic component, for example, a multilayer ceramic capacitor (MLCC).

BACKGROUND

A multilayer ceramic capacitor, a multilayer electronic component, is mounted on the printed circuit boards of various electronic products such as display devices including liquid crystal displays (LCDs), plasma display panels (PDPs), and the like, computers, smartphones, mobile phones, and the like to serve to charge or discharge electricity.

With recent trends, such multilayer ceramic capacitors have been miniaturized and highly integrated. Thinning has been required for miniaturization and high integration while satisfying the ultra-high dielectric characteristics for the next-generation products. Therefore, it is becoming important to apply a composition material, capable of implementing high-k dielectric characteristics, to a dielectric layer.

SUMMARY

An aspect of the present disclosure is to provide a ceramic electronic component having improved reliability.

The present disclosure proposes various solutions. One of the proposed solutions is to apply an optimal composition ratio of tin (Sn) and dysprosium (Dy) included in a single dielectric layer.

According to an aspect of the present disclosure, a ceramic electronic component includes a body, including a dielectric layer and an internal electrode, and an external electrode disposed on the body and connected to the internal electrode. At least a region of the dielectric layer includes tin (Sn) and a lanthanide rare earth element (RE) including dysprosium (Dy). In the at least a region of the dielectric layer, a molar ratio of tin (Sn) to dysprosium (Dy) is from 0.15 to 0.30.

In some embodiments, in the at least a region of the dielectric layer, a molar ratio (Sn/RE) of tin (Sn) to the lanthanide rare earth element (RE) may be from 0.15 to 0.25.

In some embodiments, the dielectric layer may further include a barium titanate-based material as a main component.

In some embodiments, in the at least a region of the dielectric layer, a content of tin (Sn) may be from 0.05 mole to 0.16 mole per 100 moles of the barium titanate-based material, and a content of dysprosium (Dy) may be from 0.20 mole to 0.80 mole per 100 moles of the barium titanate-based material.

In some embodiments, the lanthanide rare earth element (RE) may further include at least one of terbium (Tb), samarium (Sm), and gadolinium (Gd).

In some embodiments, the at least a region of the dielectric layer may include an acceptor element (AT) including at least one of manganese (Mn), aluminum (Al), vanadium (V), and magnesium (Mg).

In some embodiments, the at least a region of the dielectric layer may further include a donor element (DN) including at least one of the lanthanide rare earth element (RE), niobium (Nb), and yttrium (Y).

In some embodiments, in the at least a region of the dielectric layer, a molar ratio of the donor element (DN) to the acceptor element (AT) may be from 0.01 to 0.50.

In some embodiments, the body may include an active portion having capacitance, the active portion may include a plurality of internal electrodes in which adjacent internal electrodes may be disposed to oppose each other with the dielectric layer interposed between the adjacent internal electrodes. The at least a region of the dielectric layer may be disposed in the active portion.

In some embodiments, the external electrode may include a first external electrode and a second external electrode, respectively disposed on opposite end surfaces of the body in a length direction. The internal electrode may include a plurality of first internal electrodes and a plurality of second internal electrodes alternately laminated in a thickness direction of the body and respectively connected to the first and second external electrodes.

In some embodiments, the dielectric layer may have a thickness of 0.4 μm or more. The internal electrode may have a thickness of 0.4 μm or less.

In some embodiments, in the at least a region of the dielectric layer, a content of tin (Sn) may be from 0.05 mole to 0.16 mole per 100 moles of the barium titanate-based material.

In some embodiments, in the at least a region of the dielectric layer, a content of dysprosium (Dy) may be from 0.20 mole to 0.80 mole per 100 moles of the barium titanate-based material.

In some embodiments, the donor element (DN) may consist of the lanthanide rare earth element (RE).

In some embodiments, the acceptor element (AT) may include manganese (Mn), aluminum (Al), and vanadium (V).

In some embodiments, the acceptor element (AT) may consist of manganese (Mn), aluminum (Al), and vanadium (V), and optionally magnesium (Mg).

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Hereinafter, exemplary embodiments in the present disclosure will be described with reference to the accompanying drawings. In the accompanying drawings, shapes, sizes, and the like, of components may be exaggerated or omitted for clarity.

In the drawings, a first direction may be defined as a lamination direction or a thickness direction, a second direction may be defined as a length direction, and a third direction may be defined as a width direction.

Figure 1:
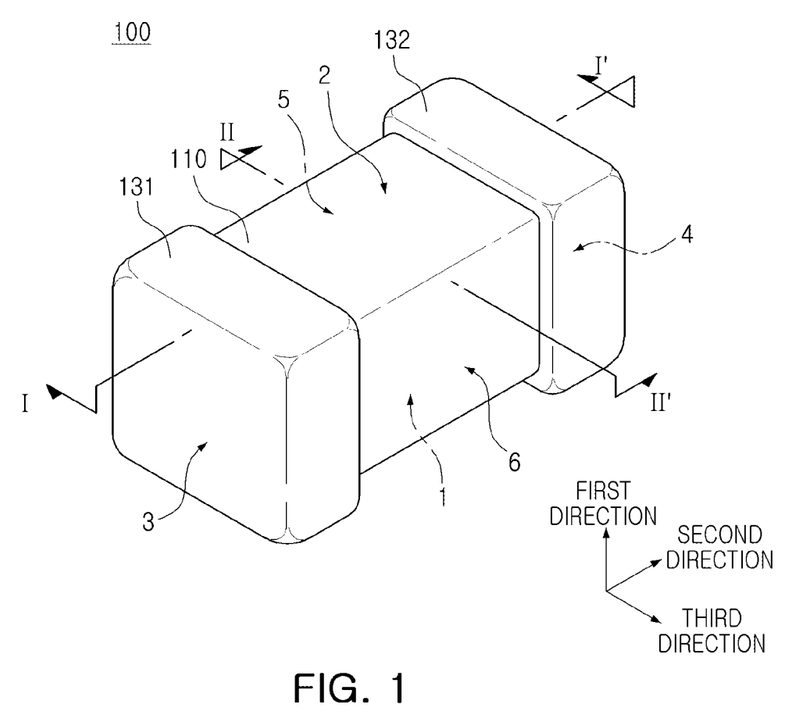
FIG. 1 is a schematic perspective view of a ceramic electronic component according to an example.

FIG. 1 is a schematic perspective view of a ceramic electronic component according to an example.

Figure 2:
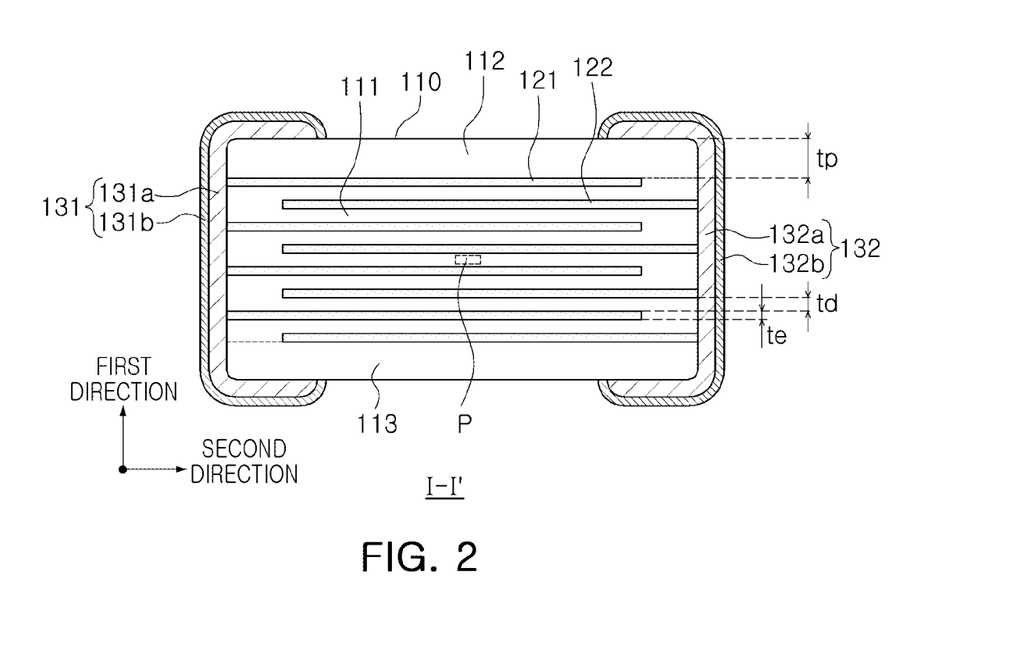
FIG. 2 is a schematic cross-sectional view taken along line I-I' of FIG. 1.

FIG. 2 is a schematic cross-sectional view taken along line I-I' of FIG. 1.

Figure 3:
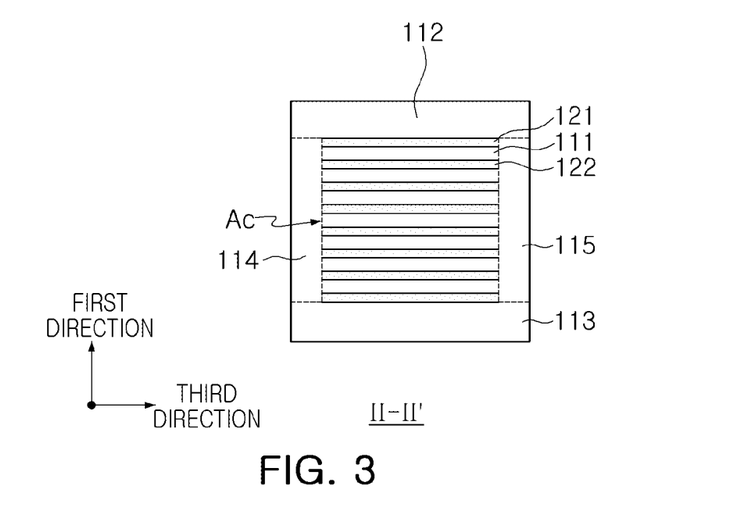
FIG. 3 is a schematic cross-sectional view taken along line II-II' of FIG. 1.

FIG. 3 is a schematic cross-sectional view taken along line II-II' of FIG. 1.

Figure 4:
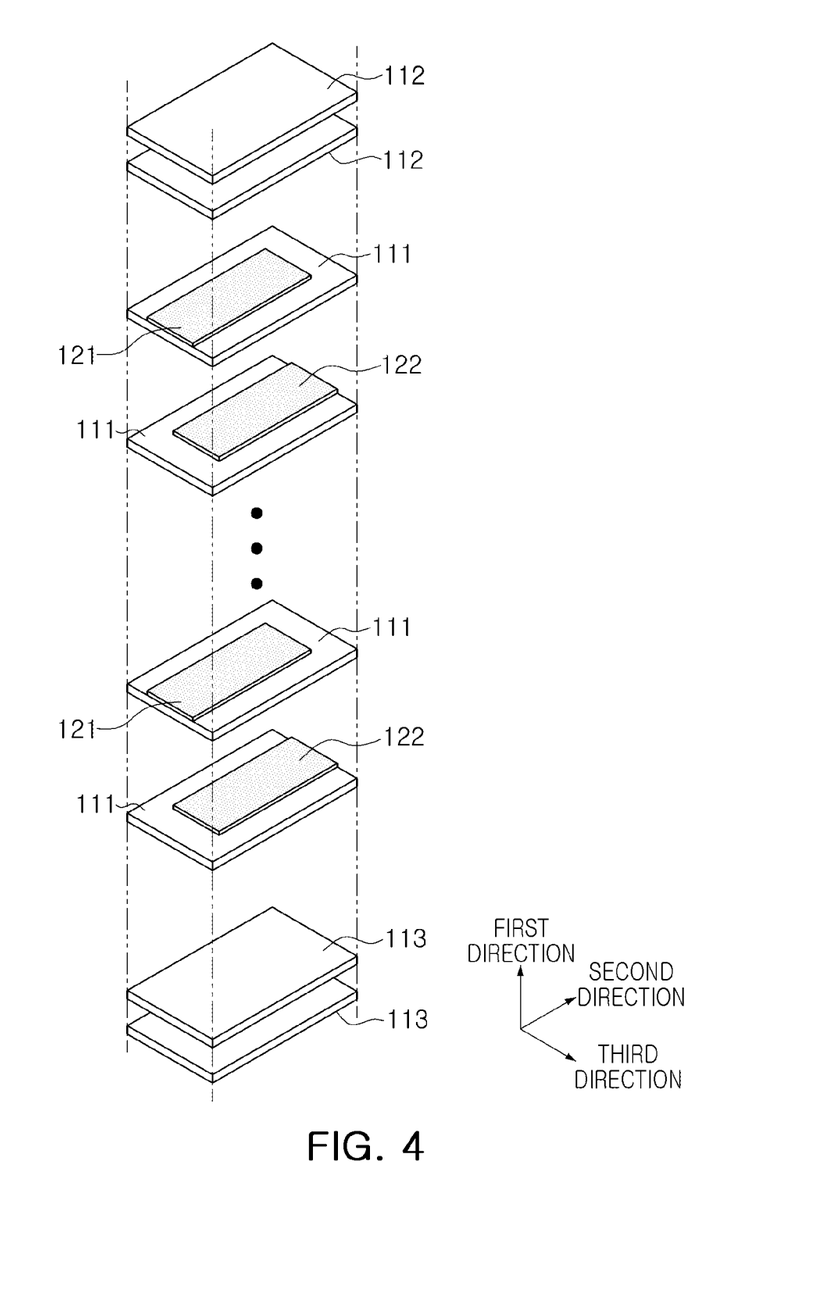
FIG. 4 is a schematic exploded perspective view of a body of the ceramic electronic component according to an example of FIG. 1.

FIG. 4 is a schematic exploded perspective view of a body of the ceramic electronic component according to an example of FIG. 1.

Referring to the drawings, a ceramic electronic component 100 according to an example may include a body 110, including a dielectric layer 111 and internal electrodes 121 and 122, and external electrodes 131 and 132 disposed on the body 110 and connected to the internal electrodes 121 and 122. In this case, at least a region P of the dielectric layer 111 may include a lanthanide rare earth element (RE) including tin (Sn) and dysprosium (Dy). In the at least a region P of the dielectric layer, a molar ratio of tin (Sn) and dysprosium (Dy) (Sn/Dy) may be about 0.15 to 0.30. In addition, a molar ratio of tin (Sn) and lanthanide rare earth element (RE) (Sn/RE) may be about 0.15 to 0.25.

To develop next-generation ultra-small high-capacitance products, it is becoming necessary to introduce and dissolve an appropriate level of an A-site and/or B-site substitutional element in a barium titanate-based material having a perovskite structure represented by additive-dissolved $ABO_3$ as a material of a dielectric layer. In particular, to implement high-reliability characteristics, it is becoming important to control an influence on implementation of shrinkage behavior and characteristics between respective portions, constituting a product, through adjustment of combination and concentration of an additive between the respective portions.

Therefore, in the present disclosure, a combination in which a high content of donor is applied as a dopant to increase dissolution efficiency of an A-site was applied as an example to secure thin-film high-reliability characteristics.

For example, in the case of rare earth elements, donor elements known as A-site substitutional elements of barium titanate, in particular, dysprosium (Dy) which is a representative amphoteric element and may have a valence modified into positive divalent and/or positive trivalent to help improving oxygen vacancy to achieve a reliability improvement effect, it may be favorably used as a boundary element due to low solid-solution efficiency thereof.

In the case of products for implementing thin-film high-reliability which have been recently developed, the application of a high-temperature uniaxial sintering method has been taken into consideration to prevent breakage of a thin-film internal electrode and to match a sintering temperature. However, when the heat transfer required for sintering is insufficient, dissolution efficiency of the dysprosium (Dy) may be reduced, and non-uniform solid-solution characteristics may deteriorate characteristics of a final chip. In addition, when the amount of heat required for sufficient sintering is transferred by increasing sintering time, a dysprosium (Dy) element may also be completely solid-solubilized to make it difficult to distinguish a core from a shell.

Therefore, in a product to which a next-generation thin-film design is applied, a composition system with a low content of dysprosium (Dy), in which a content of an additive is significant reduced, in particular, in which it is difficult to dissolve an A-site, may be taken into consideration. However, as described above, when the content of dysprosium (Dy) is low, there may be a limitation in improving thin-film reliability.

Meanwhile, in the present disclosure, a dielectric composition including tin (Sn) may be applied. In this case, substitution efficiency of an A-site may be improved, so that contents and a composition ratio of the rare earth elements may be changed. Thus, contents of tin (Sn) and dysprosium (Dy) may be increased and an optimal composition ratio thereof may be applied to improve thin-film reliability.

For example, in the present disclosure, a composition containing tin (Sn) may be applied as a material of the dielectric layer 111. Accordingly, a content of dysprosium (Dy), an A-site substitutional element, may be increased to result in reliability improvement. In addition, an appropriate level of a combination for significantly increasing A-site and B-site substitution efficiency may be selected to provide a composition ratio at which improved reliability characteristics may be implemented.

In this regard, the dielectric composition according to an example may include a barium titanate-based material, and may also include tin (Sn) and a lanthanide-based earth-earth element (RE) including dysprosium (Dy). In this case, a molar ratio of tin (Sn) and dysprosium (Dy) (Sn/Dy) may be about 0.15 to 0.30 to control a solid-solution limit of dysprosium (Dy) in a barium titanate lattice and to effectively induce uniform grain boundary segregation. In addition, a ratio of tin (Sn) and a lanthanide rare earth element (RE) (Sn/RE) may be about 0.15 to 0.25 control a solid-solution limit in a barium titanate lattice and to effectively induce uniform grain boundary segregation at a ratio within substantially the same range for the lanthanide rare earth element (RE). A content of tin (Sn) may be 0.05 to 0.16 moles per 100 moles of the barium titanate-based material, and a content of dysprosium (Dy) may be about 0.20 to 0.80 moles per 100 moles of the barium titanate-based material.

In the dielectric composition according to an example, the lanthanide rare earth element (RE) may further include at least one of terbium (Tb), samarium (Sm), and gadolinium (Gd), other than dysprosium (Dy). Such rare earth elements may serve a donor role by substituting an A-site of an $ABO_3$ structure to reduce an oxygen vacancy concentration and to further improve reliability. In addition, the rare earth element may serve as a barrier blocking a flow of electrons at a grain boundary to suppress an increase in leakage current.

The dielectric composition according to an example may further include an acceptor element (AT) including at least one of manganese (Mn), aluminum (Al), vanadium (V), and magnesium (Mg). Such an acceptor element (AT) may substitute the B-site of the $ABO_3$ structure to serve as an acceptor, serving to reduce an electron concentration. Accordingly, such an acceptor element (AT) may suppress semiconductorization of the dielectric layer by A-site solid solution of a rare earth element. In addition, such an acceptor element (AT) may serve to lower a sintering temperature and to improve high-temperature withstand voltage characteristics of the ceramic electronic component to which the dielectric composition is applied.

In addition, the dielectric composition according to an example may further include a donor element (DN) including at least one of the above-described lanthanide rare earth element (RE), niobium (Nb), and yttrium (Y). Similarly, such a donor element (DN) may substitute the A-site of the $ABO_3$ structure to serve as a donor, and thus, may reduce an oxygen vacancy concentration to further improve reliability.

Similarly, such a donor may also serve as a barrier to block a flow of electrons at the grain boundary, and thus, may suppress an increase in leakage current.

In this case, a molar ratio of the donor element (DN) and the acceptor element (AT) (DN/AT) may be about 0.01 to 0.50 to secure an appropriate level of insulation resistance, or the like.

Accordingly, at least a region P of the dielectric layer 111 may include tin (Sn) and a lanthanide rare earth element (RE) including dysprosium (Dy). In this case, a molar ratio of tin (Sn) and dysprosium (Dy) (Sn/Dy) may be about 0.15 to 0.30. In addition, a molar ratio of tin (Sn) to the lanthanide rare earth element (RE) (Sn/RE) may be about 0.15 to 0.25. A content of tin (Sn) may be 0.05 to 0.16 moles per 100 moles of the barium titanate-based material, and the content of dysprosium (Dy) may be about 0.20 to 0.80 moles per 100 moles of the barium titanate-based material.

In addition, in the at least a region P of the dielectric layer 111, the lanthanide rare earth element (RE) may further include at least one of terbium (Tb), samarium (Sm) and gadolinium (Gd), other than dysprosium (Dy). In addition, in the at least a region P of the dielectric layer 111, the dielectric composition for forming the dielectric layer 111 may further include an acceptor element (AT) including at least one of manganese (Mn), aluminum (Al), vanadium (V), and magnesium (Mg). In addition, the dielectric composition for forming the dielectric layer 111 may further include a donor element (DN) including at least one of the lanthanide rare earth element (RE), niobium (Nb), and yttrium (Y). In this case, a molar ratio of the donor element (DN) and the acceptor element (AT) (DN/AT) may be about 0.01 to 0.50.

A composition of the at least a region P of the dielectric layer 111 may be measured through transmission electron microscopy-energy dispersive spectrometer (TEM-EDS) elemental analysis. For example, after focused ion beam (FIB) sampling for TEM analysis of a sample chip, type and content of included elements may be confirmed through TEM-EDS mapping. Then, to confirm a ratio corresponding to a base material such as barium titanate among the analyzed elements, an analysis ratio of a corresponding element may be divided by an analysis ratio of titanium (Ti) to confirm how much mole % of the base material includes the corresponding material.

The at least a region P of the dielectric layer 111 may be disposed in an active portion Ac to be described later.

Hereinafter, respective components included in the ceramic electronic component 100 according to an example will be described in more detail.

A specific shape of the body 110 is not limited, but may be an overall hexahedral shape or a shape similar to a hexahedral shape. Although the body 110 may not have a hexahedral shape having perfectly straight lines due to shrinkage of ceramic powders included in the body 110 in a sintering process, the body 110 may have a substantially hexahedral shape. As necessary, an angular portion of the body 110, for example, a corner portion may be polished to be rounded by a polishing process, or the like.

The body 110 may have a first surface 1 and a second surface 2 opposing each other in a first direction, a third surface 3 and a fourth surface 4 connected to the first and second surfaces 1 and 2 and opposing each other in a second direction, and a fifth surface 5 and a sixth surface 6 connected to the first and second surfaces 1 and 2 as well as to the third and fourth surfaces 3 and 4 and opposing each other in a third direction.

In the body 110, dielectric layers 111 and internal electrodes 121 and 122 may be alternately laminated. A plurality of dielectric layers 111 forming the body 110 may be in a sintered state, and adjacent dielectric layers 111 may be integrated with each other so that boundaries therebetween may not be readily apparent without using a scanning electron microscope (SEM).

The dielectric layer 111 may be formed by sintering a ceramic green sheet including ceramic powder particles, an organic solvent, and an organic binder. The ceramic powder particles are a material having a high-k dielectric constant. As the ceramic powder particles, a barium titanate ($BaTiO_3$)-based material, a strontium titanate ($SrTiO_3$)-based material, or the like and, in detail, the above-described barium titanate-based material may be used.

A thickness td of the dielectric layer 111 does not need to be limited. However, in general, when the dielectric layer 111 is formed to have a low thickness of less than 0.6 μm, in particular, when the thickness of the dielectric layer 111 is 0.4 μm or less, reliability may be deteriorated. Meanwhile, in the present disclosure, even when the dielectric layer 111 has a thickness of 0.4 μm or less, improved reliability may be secured as described above. Accordingly, when the thickness of the dielectric layer 111 is 0.4 μm or less, a reliability improvement effect according to the present disclosure may be more significant, and miniaturization and high capacitance of the ceramic electronic component may be more easily achieved.

The thickness td of the dielectric layer 111 may refer to an average thickness of the dielectric layer 111 disposed between the internal electrodes 121 and 122. The average thickness of the dielectric layer 111 may be measured by scanning an image of a cross-section of the body 110 in the length and thickness directions (L-T) using a scanning electron microscope (SEM) with a magnification of 10,000 times. For example, the average value may be measured by measuring thicknesses at 30 points of one dielectric layer at equal intervals in the length direction in the scanned image. The 30 points at equal intervals may be designated in an active portion Ac. In addition, when the average value is measured by extending the measurement of the average value to 10 dielectric layers 111, the average thickness of the dielectric layers 111 may be further generalized.

The body 110 may include an active portion Ac in which capacitance is formed by including a plurality of first internal electrodes 121 and second internal electrodes 122 disposed to oppose each other with the dielectric layer 111 interposed therebetween. The active portion Ac may be a portion contributing to formation of capacitance of the capacitor, and may be formed by repeatedly laminating a plurality of first internal electrodes 121 and second internal electrodes 122 with a dielectric layer 111 interposed therebetween.

The body 110 may further include cover portions 112 and 113 disposed above and below the active portion Ac, based on a thickness direction. The cover portions 112 and 113 may include an upper cover portion 112, disposed above the active portion Ac, and a lower cover portion 113 disposed below the active portion Ac. The upper cover portion 112 and the lower cover portion 113 may be formed by laminating a single dielectric layer or two or more dielectric layers on the upper and lower surfaces of the active portion Ac in the thickness direction, respectively. The upper and lower cover portions 112 and 113 may basically serve to prevent damage, caused by physical or chemical stress, to the internal electrodes 121 and 122. The cover portions 112 and 113 may not include internal electrode, and may include the same material as the dielectric layer 111. For example, the cover portions 112 and 113 may include a ceramic material, for example, the above-described barium titanate-based material. A thickness of the cover portions 112 and 113 does not need to be limited. However, to more easily achieve miniaturization and high capacitance of the ceramic electronic component, a thickness tp of the cover portions 112 and 113 may be 20 µm or less.

The body 110 may further include margin portions 114 and 115 disposed on side surfaces of the active portion Ac. The margin portions 114 and 115 may include a margin portion 114, disposed on the fifth surface 5 of the body 110, and a margin portion 115 disposed on the sixth surface 6 of the body 110. For example, the margin portions 114 and 115 may be disposed on opposite side surfaces of the body 110 in a width direction. The margin portions 114 and 115 may refer to a region between opposite ends of the internal electrodes 121 and 122 and an interface of the body 110 in a cross-section of the body 110, taken in a width-thickness direction. The margin portions 114 and 115 may basically serve to prevent damage, caused by physical or chemical stress, to the internal electrodes 121 and 122. The margin portions 114 and 115 may include a material the same as or different from a material of the dielectric layer 111. For example, the margin portions 114 and 115 may be formed by applying a conductive paste to a ceramic green sheet, except a portion in which the margin portion is to be formed, to form an internal electrode. Alternatively, to suppress a step caused by the internal electrodes 121 and 122, the internal electrodes 121 and 122 may be cut to be exposed to the fifth surface 5 and the sixth surface 6 of the body 110 after lamination, and a single dielectric layer or two or more dielectric layers may then be laminated on opposite side surfaces of the active portion Ac in the width direction to form the margin portions 114 and 115.

The internal electrodes 121 and 122 may be alternately laminated with the dielectric layer 111. The internal electrodes 121 and 122 may include a plurality of first internal electrodes 121 and second internal electrodes 122. The plurality of first internal electrodes 121 and the plurality of second internal electrodes 122 may be alternately disposed to face each other with respective dielectric layers 111 interposed therebetween, and may be exposed to the third and fourth surfaces 3 and 4, respectively. For example, each of the plurality of first internal electrodes 121 may be spaced apart from the fourth surface 4 to be exposed through the third surface 3. In addition, each of the plurality of second internal electrodes 122 may be spaced apart from the third surface 3 to be exposed through the fourth surface 4. The plurality of first internal electrodes 121 and second internal electrodes 122 may be electrically insulated from each other by a dielectric layer 111 disposed therebetween.

The internal electrodes 121 and 122 may be formed by a conductive paste including a conductive metal. For example, the internal electrodes 121 and 122 may be printed by printing a conductive paste on the ceramic green sheet, forming the dielectric layer 111, through a printing method such as a screen printing method or a gravure printing method. When the ceramic green sheets on which the internal electrodes 121 and 122 are printed are alternately laminated and sintered, the active portion Ac of the body 110 may be formed. The conductive metal may include, but is not limited to, nickel (Ni), copper (Cu), palladium (Pd), silver (Ag), gold (Au), platinum (Pt), tin (Sn), tungsten (W), titanium (Ti), or alloys thereof.

A thickness to of the internal electrodes 121 and 122 does not need to be limited. However, in general, when the internal electrodes 121 and 122 are formed to have a low thickness of less than 0.6 µm, in particular, when the thickness of the internal electrodes 121 and 122 was 0.4 µm or less, there was a probability that reliability would be deteriorated. Meanwhile, in the present disclosure, even when the thickness of the internal electrodes 121 and 122 is 0.4 µm or less, improved reliability may be secured as described above. Accordingly, when the thickness of the internal electrodes 121 and 122 is 0.4 µm or less, a reliability improvement effect according to the present disclosure may be more significant, and miniaturization and high capacitance of the ceramic electronic component may be more easily achieved.

The thickness to of the internal electrodes 121 and 122 may refer to an average thickness of the internal electrodes 121 and 122. The average thickness of the internal electrodes 121 and 122 may be measured by scanning an image of a cross-section of the body 110 in the length and thickness directions (L-T) using a scanning electron microscope (SEM) with a magnification of 10,000 times. For example, the average value may be measured by measuring thicknesses at 30 points of one dielectric layer at equal intervals in the length direction in the scanned image. The 30 points at equal intervals may be designated in an active portion Ac. In addition, when the average value is measured by extending the measurement of the average value to 10 dielectric layers 111, the average thickness of the dielectric layers 111 may be further generalized.

The external electrodes 131 and 132 may be disposed on the third surface 3 and the fourth surface 4 of the body 110 in such a manner that a portion thereof extends to each of the first surface 1, the second surface 2, the fifth surface 5, and the sixth surface 6. The external electrodes 131 and 132 may include a first external electrode 131 and a second external electrode 132, respectively connected to the plurality of first internal electrodes 121 and the plurality of second internal electrodes 122. The first external electrode 131 may be disposed on the third surface 3 of the body 110 in such a manner that a portion thereof extends to each of the first surface 1, the second surface 2, the fifth surface 5, and the sixth surface of the body 110. The second external electrode 132 may be disposed on the fourth surface 4 of the body 110 in such a manner that a portion thereof extends to each of the first surface 1, the second surface 2, the fifth surface 5, and the sixth surface of the body 110. Each of the faces 6 may partly extend. In the drawings, the ceramic electronic component 100 is illustrated as including two external electrodes 131 and 132, but the number and shape of the external electrodes 131 and 132 may vary depending on a shape of the internal electrodes 121 and 122, or other purposes.

The external electrodes 131 and 132 may be formed of any material, as long as it has electrical conductivity, such as a metal. A specific material may be determined in consideration of electrical characteristics and structural stability. Furthermore, the external electrodes 131 and 132 may have a multilayer structure. For example, the external electrodes 131 and 132 may include electrode layers 131a and 132a, disposed on the body 110, and plating layers 131b and 132b formed on the electrode layers 131a and 132a.

Each of the electrode layers 131a and 132a may be, for example, a sintered electrode including a conductive metal and glass, or a resin-based electrode including a conductive metal and a resin. In addition, the electrode layers 131a and 132a may have a form in which a sintered electrode and a resin-based electrode are sequentially formed on the body 110. In addition, the electrode layers 131a and 132a may be formed in a manner of transferring a sheet including a conductive metal onto the body 110 or transferring a sheet including a conductive metal onto the sintered electrode. As the conductive metal included in the electrode layers 131a and 132a, a material having improved electrical conductivity may be used, and the material is not limited. For example, the conductive metal may include copper (Cu), nickel (Ni), palladium (Pd), platinum (Pt), gold (Au), silver (Ag), lead (Pb) or alloys thereof.

The plating layers 131b and 132b may serve to improve mounting characteristics. The plating layers 131b and 132b are not limited in type, and may be a plating layer including nickel (Ni), tin (Sn), palladium (Pd) or alloys thereof, or may include a plurality of layers. The plating layers 131b and 132b may be, for example, a nickel (Ni) plating layer or a tin (Sn) plating layer, or may be in a form which a nickel (Ni) plating layer and a tin (Sn) plating layer are sequentially formed on the electrode layers 131a and 132a. In addition, the plating layers 131b and 132b may include a plurality of nickel (Ni) plating layers and/or a plurality of tin (Sn) plating layers.

A size of the ceramic electronic component 100 does not need to be limited. However, to achieve miniaturization and high capacitance at the same time, the thicknesses of the dielectric layer 111 and the internal electrodes 121 and 122 should be reduced to increase the number of laminated layers, so that in ceramic electronic component 100 which should have a size of 1005 (length×width: 1.0 mm×0.5 mm) or less, the reliability improvement effect according to the present disclosure may be more significant. Accordingly, in consideration of manufacturing errors and sizes of the external electrodes 131 and 132, when the ceramic electronic component 100 has a length of 1.1 mm or less and a width of 0.55 mm or less, the reliability improvement effect may be more significant. The length of the ceramic electronic component 100 may refer to a size in the length direction, and the width of the ceramic electronic component 100 may refer to a size in the width direction.

Experimental Example

After preparing a dielectric composition including a barium titanate-based material as a main component and including subcomponents such as rare earth elements, a conductive paste for an internal electrode including nickel (Ni) was applied to a ceramic green sheet, including the dielectric composition, to form an internal electrode pattern. A laminate, obtained by laminating the ceramic green sheets on which the internal electrode pattern was formed, was cut in units of chips and then sintered to prepare sample chips.

Each sample included components contained in contents (unit: moles) of Table 1, per 100 moles of the barium titanate-based material. In each of the sample chips, each of a dielectric layer and an internal electrode had a thickness of 0.4 μm or less, and a chip size was 1005 sized or less. A grain size of a dielectric layer in a central portion of each of the sample chips was 600 nm or less, lanthanide elements were additionally present in a dielectric grain boundary, and elements such as silicon (Si), magnesium (Mg), tin (Sn), and the like, were present in a dielectric grain.

Compositions of dielectric layers in Table 1 below were measured through the above-described TEM-EDS elemental analysis. For example, to perform TEM analysis of a sample chip, after FIB sampling, types and contents of included element were measured through TEM-EDS mapping. Then, to measure a ratio corresponding to a base material such as barium titanate among the analyzed elements, an analysis ratio of a corresponding element was divided by an analysis ratio of titanium (Ti) to measure how much mole % of the base material includes the corresponding material.

In addition, in Table 1, reliability was measured using a high-temperature insulation resistance meter, and a failure rate was measured when a 24 Hr voltage was applied, under conditions corresponding to (a rated voltage of a product)× 1.5 and (a rated temperature of the product)+20° C. (for example, 105° C. and 9.45 V in the case of a target model of X5R and 6.3 V). In the case in which the failure rate was less than 10%, reliability was excellent and represented by O. In the other cases, reliability was poor and represented by X. When it was confirmed that final insulation resistance was $10^4\Omega$ or less after 24 hr evaluation, it was poor reliability and represented by X, irrespective of the failure rate.

TABLE 1

| | RE(or DN) | | | | AT | | | | Molar Ratio | | | |
|---|---|---|---|---|---|---|---|---|---|---|---|---|
| | Sn | Dy | Tb | Sm | Gd | Mn | Al | V | Mg | Sn/Dy | Sn/RE | DN/AT | *RLB |
| 1 | 0.1 | 0.1 | — | — | — | 0.24 | 0.24 | 0.1 | 0.467 | 1.00 | 1.00 | 0.10 | X |
| 2 | 0.1 | 0.2 | — | — | — | 0.24 | 0.24 | 0.1 | 0.467 | 0.50 | 0.50 | 0.19 | X |
| 3 | 0.1 | 0.3 | — | — | — | 0.24 | 0.24 | 0.1 | 0.467 | 0.33 | 0.33 | 0.29 | X |
| 4 | 0.1 | 0.4 | — | — | — | 0.24 | 0.24 | 0.1 | 0.467 | 0.25 | 0.25 | 0.38 | ○ |
| 5 | 0.1 | 0.6 | — | — | — | 0.24 | 0.36 | 0.1 | 0.5 | 0.17 | 0.17 | 0.50 | ○ |
| 6 | 0.1 | 0.8 | — | — | — | 0.24 | 0.36 | 0.1 | 0.5 | 0.13 | 0.13 | 0.67 | X |
| 7 | 0.1 | 1.4 | — | — | — | 0.24 | 0.36 | 0.1 | 0.5 | 0.07 | 0.07 | 1.17 | X |
| 8 | 0.15 | 0.6 | — | — | — | 0.24 | 0.24 | 0.1 | 0.5 | 0.25 | 0.25 | 0.56 | ○ |
| 9 | 0.04 | 0.6 | — | — | — | 0.24 | 0.36 | 0.1 | 0.5 | 0.07 | 0.07 | 0.50 | X |
| 10 | 0.05 | 0.6 | — | — | — | 0.24 | 0.36 | 0.1 | 0.5 | 0.08 | 0.08 | 0.50 | X |
| 11 | 0.2 | 0.6 | — | — | — | 0.24 | 0.36 | 0.1 | 0.5 | 0.33 | 0.33 | 0.50 | X |
| 12 | 0.3 | 0.6 | — | — | — | 0.24 | 0.36 | 0.1 | 0.5 | 5.00 | 0.50 | 0.50 | X |
| 13 | 0.1 | 0.6 | 0.03 | — | — | 0.24 | 0.36 | 0.1 | 0.5 | 0.17 | 0.16 | 0.53 | ○ |
| 14 | 0.1 | 0.6 | 0.05 | — | — | 0.24 | 0.36 | 0.1 | 0.5 | 0.17 | 0.15 | 0.54 | ○ |
| 15 | 0.1 | 0.6 | — | 0.01 | — | 0.24 | 0.36 | 0.1 | 0.5 | 0.17 | 0.16 | 0.51 | ○ |
| 16 | 0.1 | 0.6 | — | 0.03 | — | 0.24 | 0.36 | 0.1 | 0.5 | 0.17 | 0.16 | 0.53 | ○ |
| 17 | 0.1 | 0.6 | — | 0.05 | — | 0.24 | 0.36 | 0.1 | 0.5 | 0.17 | 0.15 | 0.54 | ○ |
| 18 | 0.1 | 0.6 | — | — | 0.01 | 0.24 | 0.36 | 0.1 | 0.5 | 0.17 | 0.16 | 0.51 | ○ |
| 19 | 0.1 | 0.6 | — | — | 0.03 | 0.24 | 0.36 | 0.1 | 0.5 | 0.17 | 0.16 | 0.53 | ○ |
| 20 | 0.1 | 0.6 | — | — | 0.05 | 0.24 | 0.36 | 0.1 | 0.5 | 0.17 | 0.15 | 0.54 | ○ |
| 21 | 0.09 | 0.6 | — | — | — | 0.24 | 0.36 | 0.1 | 0.5 | 0.15 | 0.15 | 0.50 | ○ |
| 22 | 0.18 | 0.6 | 0.2 | — | — | 0.24 | 0.36 | 0.1 | 0.5 | 0.30 | 0.23 | 0.67 | ○ |
| 23 | 0.25 | 0.21 | — | — | — | 0.05 | 2.16 | 1.06 | 0 | 1.19 | 1.19 | 0.06 | X |

TABLE 1-continued

|  |  | RE(or DN) | | | | AT | | | | Molar Ratio | | | |
| --- | --- | --- | --- | --- | --- | --- | --- | --- | --- | --- | --- | --- | --- |
|  | Sn | Dy | Tb | Sm | Gd | Mn | Al | V | Mg | Sn/Dy | Sn/RE | DN/AT | *RLB |
| 24 | 0.1 | 0.3 | — | — | — | 0.1 | 2.4 | 1.2 | 0 | 0.33 | 0.33 | 0.08 | X |
| 25 | 0.1 | 0.4 | — | — | — | 0.1 | 2.4 | 1.2 | 0 | 0.25 | 0.25 | 0.11 | ○ |
| 26 | 0.1 | 0.6 | — | — | — | 0.1 | 2.4 | 1.2 | 0 | 0.17 | 0.17 | 0.16 | ○ |
| 27 | 0.1 | 0.4 | 0.01 | — | — | 0.1 | 2.4 | 1.2 | 0 | 0.25 | 0.24 | 0.11 | ○ |
| 28 | 0.1 | 0.4 | — | 0.01 | — | 0.1 | 2.4 | 1.2 | 0 | 0.25 | 0.24 | 0.11 | ○ |
| 29 | 0.1 | 0.4 | — | — | 0.01 | 0.1 | 2.4 | 1.2 | 0 | 0.25 | 0.24 | 0.11 | ○ |
| 30 | 0.1 | 0.4 | — | — | — | 0.1 | 2.4 | 1.2 | 0.1 | 0.25 | 0.25 | 0.11 | ○ |

*RLB: Reliability

Referring to Table 1, it can be seen that as in sample chips 1 to 3, 6 to 7, and 23 to 24, when a content of dysprosium (Dy) was insufficient or excessive and thus molar ratios of Sn/Dy and Sn/RE did not satisfy a range disclosed in the present disclosure, reliability characteristics deteriorated.

In addition, it can be seen that as in sample chips 9 to 11, when a content of tin (Sn) was insufficient and thus molar ratios of Sn/Dy and Sn/RE did not satisfy the range disclosed in the present disclosure, reliability characteristics deteriorated.

In addition, it can be seen that as in sample chips 11 and 12, when a content of tin (Sn) was excessive and thus molar ratios of Sn/Dy and Sn/RE did not satisfy the range disclosed in the present disclosure, a sintering temperature increased, so that IR split increased and lead to a deterioration in reliability characteristics.

Meanwhile, it can be seen that as in sample chips 4 and 5, 8, 21, 25 and 26, and 30, when molar ratios of Sn/Dy and Sn/RE did not satisfy the range disclosed in the present disclosure, reliability was excellent.

In addition, it can be seen that as in sample chips 13 to 20, 22, and 27 to 29, when the composition disclosed in the present disclosure was satisfied while adding a lanthanide rare earth element (RE), reliability characteristics were more remarkable due to the introduction of A-site substitution efficiency increase elements, and the like.

In the present disclosure, a multilayer ceramic capacitor has been described as a ceramic electronic component. However, the present disclosure is not limited thereto and may also be applied to other types of ceramic electronic component such as an inductor, a piezoelectric element, a varistor, a thermistor, and the like.

As described above, a ceramic electronic component having improved reliability may be provided.

In the present disclosure, the terms "lower side", "lower portion", "lower surface," and the like, have been used to indicate a direction toward a mounted surface of the electronic component package in relation to cross sections of the drawings, the terms "upper side", "upper portion", "upper surface," and the like, have been used to indicate an opposite direction to the direction indicated by the terms "lower side", "lower portion", "lower surface," and the like. However, these directions are defined for convenience of explanation only, and the claims are not particularly limited by the directions defined, as described above.

The meaning of a "connection" of a component to another component in the description includes an indirect connection through an adhesive layer as well as a direct connection between two components. In addition, "electrically connected" means including a physical connection and a physical disconnection. It can be understood that when an element is referred to as "first" and "second", the element is not limited thereby. These terms may be used only for a purpose of distinguishing the element from the other elements, and may not limit the sequence or importance of the elements. In some cases, a first element may be referred to as a second element without departing from the scope of the claims set forth herein. Similarly, a second element may also be referred to as a first element.

The term "an example embodiment" used herein does not always refer to the same example embodiment, and is provided to emphasize a particular feature or characteristic different from that of another example embodiment. However, example embodiments provided herein are considered to be able to be implemented by being combined in whole or in part one with another. For example, one element described in a particular example embodiment, even if it is not described in another example embodiment, may be understood as a description related to another example embodiment, unless an opposite or contradictory description is provided therein.

Terms used herein are used only in order to describe an example embodiment rather than to limit the present disclosure. In this case, singular forms include plural forms unless necessarily interpreted otherwise, based on a particular context.

While exemplary embodiments have been shown and described above, it will be apparent to those skilled in the art that modifications and variations could be made without departing from the scope of the present disclosure as defined by the appended claims.

What is claimed is:

1. A ceramic electronic component comprising:
   a body including a dielectric layer and an internal electrode; and
   an external electrode disposed on the body and connected to the internal electrode, wherein:
   at least a region of the dielectric layer includes tin (Sn) and a lanthanide rare earth element (RE) including dysprosium (Dy),
   in the at least a region of the dielectric layer, a molar ratio of tin (Sn) to dysprosium (Dy) is from 0.15 to 0.30,
   the dielectric layer further includes a barium titanate-based material as a main component, and
   in the at least a region of the dielectric layer, a content of dysprosium (Dy) is from 0.20 mole to 0.80 mole per 100 moles of the barium titanate-based material.

2. The ceramic electronic component of claim 1, wherein:
   in the at least a region of the dielectric layer, a molar ratio (Sn/RE) of tin (Sn) to the lanthanide rare earth element (RE) is from 0.15 to 0.25.

3. The ceramic electronic component of claim 1, wherein:
   in the at least a region of the dielectric layer, a content of tin (Sn) is from 0.05 mole to 0.16 mole per 100 moles of the barium titanate-based material.

4. The ceramic electronic component of claim 1, wherein:
the lanthanide rare earth element (RE) further includes at least one of terbium (Tb), samarium (Sm), and gadolinium (Gd).

5. The ceramic electronic component of claim 4, wherein:
the at least a region of the dielectric layer includes an acceptor element (AT) including at least one of manganese (Mn), aluminum (Al), vanadium (V), and magnesium (Mg).

6. The ceramic electronic component of claim 5, wherein:
the at least a region of the dielectric layer further includes a donor element (DN) including at least one of the lanthanide rare earth element (RE), niobium (Nb), and yttrium (Y).

7. The ceramic electronic component of claim 6, wherein:
in the at least a region of the dielectric layer, a molar ratio of the donor element (DN) to the acceptor element (AT) is from 0.01 to 0.50.

8. The ceramic electronic component of claim 6, wherein:
the donor element (DN) consists of the lanthanide rare earth element (RE).

9. The ceramic electronic component of claim 8, wherein:
the acceptor element (AT) includes manganese (Mn), aluminum (Al), and vanadium (V).

10. The ceramic electronic component of claim 9, wherein:
the acceptor element (AT) consists of manganese (Mn), aluminum (Al), and vanadium (V), and optionally magnesium (Mg).

11. The ceramic electronic component of claim 1, wherein:
the internal electrode includes a plurality of internal electrodes;
the body includes an active portion having capacitance, the active portion includes the plurality of internal electrodes in which adjacent internal electrodes are disposed to oppose each other with the dielectric layer interposed between the adjacent internal electrodes; and
the at least a region of the dielectric layer is disposed in the active portion.

12. The ceramic electronic component of claim 1, wherein:
the external electrode includes a first external electrode and a second external electrode, respectively disposed on opposite end surfaces of the body in a length direction; and
the internal electrode includes a plurality of first internal electrodes and a plurality of second internal electrodes alternately laminated in a thickness direction of the body and respectively connected to the first and second external electrodes.

13. The ceramic electronic component of claim 1, wherein:
the dielectric layer has a thickness of 0.4 µm or more; and
the internal electrode has a thickness of 0.4 µm or less.

14. The ceramic electronic component of claim 13, wherein:
in the at least a region of the dielectric layer, a content of tin (Sn) is from 0.05 mole to 0.16 mole per 100 moles of the barium titanate-based material.

* * * * *